United States Patent
Tsuchizawa (10) Patent No.: US 9,090,178 B2
(45) Date of Patent: Jul. 28, 2015

(54) BICYCLE CONTROL APPARATUS

(71) Applicant: Shimano Inc., Sakai, Osaka (JP)

(72) Inventor: Yasuhiro Tsuchizawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/165,912

(22) Filed: Jan. 28, 2014

(65) Prior Publication Data

US 2014/0222268 A1     Aug. 7, 2014

(30) Foreign Application Priority Data

Feb. 7, 2013   (JP) ................. 2013-022381

(51) Int. Cl.
*B60L 15/20*     (2006.01)
*B62M 6/90*      (2010.01)
*B60L 11/00*     (2006.01)

(52) U.S. Cl.
CPC ............... *B60L 15/20* (2013.01); *B60L 11/007* (2013.01); *B62M 6/90* (2013.01); *Y02T 10/7258* (2013.01)

(58) Field of Classification Search
CPC ................................. B60L 15/20; B62M 6/50
USPC ......... 701/22; 180/206.1, 206.2, 206.3, 206.4
See application file for complete search history.

(56) References Cited

U.S. PATENT DOCUMENTS

| 2004/0206188 A1* | 10/2004 | Takamoto et al. ............... 73/781 |
| 2013/0054065 A1* | 2/2013 | Komatsu ......................... 701/22 |
| 2014/0039741 A1* | 2/2014 | Tanaka et al. .................... 701/22 |
| 2014/0166385 A1* | 6/2014 | Arimune et al. ........... 180/206.3 |
| 2014/0166386 A1* | 6/2014 | Arimune et al. ........... 180/206.3 |

FOREIGN PATENT DOCUMENTS

| JP | 2001-10581 A | 1/2001 |
| JP | 3717076 B2 | 9/2005 |

* cited by examiner

*Primary Examiner* — Mary Cheung
*Assistant Examiner* — Brian P Sweeney
(74) *Attorney, Agent, or Firm* — Global IP Counselors (57) ABSTRACT

A bicycle control apparatus is basically provided for controlling a bicycle in which a first rotational force of a crank and a second rotational force of an electric riding assistance motor for riding assistance are transmitted to a rear sprocket. The bicycle control apparatus includes a rotational force detector and a controller. The rotational force detector is configured to detecting the first rotational force imparted to the bicycle crank. The controller is programmed to reduce the second rotational force of the electric riding assistance motor to actuate a transmission of the bicycle in accordance with the first rotational force detected by the rotational force detector.

8 Claims, 8 Drawing Sheets

BICYCLE CONTROL APPARATUS

BACKGROUND

1. Field of the Invention

This invention generally relates to a bicycle control apparatus. More specifically, the present invention relates to a bicycle control apparatus for controlling a bicycle in which a first rotational force of a crank and a second rotational force of an electric riding assistance motor for riding assistance are transmitted to a rear sprocket.

2. Background Information

An example of a bicycle control apparatus is disclosed in Japanese Laid-Open Patent Publication No. 2001-10582 for controlling an electrically assisted bicycle in which an electric motor for riding assistance is used to assist pedaling force. The electric motor for riding assistance of the electrically assisted bicycle according to Japanese Laid-Open Patent Publication No. 2001-10582 is disposed in the periphery of a crank axle of the frame of a bicycle. The electrically assisted bicycle has a transmission driven by an electric actuator, and a pedaling force sensor for detecting the pedaling force of the user. In a conventional control apparatus, the electric motor for riding assistance and the transmission are controlled. Specifically, when the detected pedaling force is a certain value or greater during a gearshift action, the electric current supplied to the electric motor for riding assistance is reduced or stopped. The reduced electric current is then returned to the normal state when the detected pedaling force is less than the certain value, and the desired assist force is obtained. A high torque thereby ceases to be transmitted to the transmission during the gearshift action, and the gearshift action is smoother.

SUMMARY

Generally, the present disclosure is directed to various features of a bicycle operating apparatus. As is the case with the bicycle control apparatus of Japanese Laid-Open Patent Publication No. 2001-10582, sometimes the user feels that the assisting force has been cut off when the electric current supplied to the electric motor for riding assistance is simply reduced during the gearshift action to limit the assisting force of the electric motor for riding assistance.

An object of the present invention is to make it unlikely for a user to feel that assisting force has been cut off during a gearshift action.

In view of the state of the known technology and in accordance with a first aspect of the present disclosure, a bicycle control apparatus is provided for controlling a bicycle in which a first rotational force of a crank and a second rotational force of an electric riding assistance motor for riding assistance are transmitted to a rear sprocket. The bicycle control apparatus comprises a rotational force detector and a controller. The rotational force detector is configured to detecting the first rotational force imparted to the bicycle crank. The controller is programmed to reduce the second rotational force of the electric riding assistance motor to actuate a transmission of the bicycle in accordance with the first rotational force detected by the rotational force detector.

In this bicycle control apparatus, the controller reduces the second rotational force to actuate the transmission in accordance with the first rotational force detected by the detector. Because the assisting force is reduced during the gearshift action, the gearshift action can be performed smoothly. Because the second rotational force is not simply reduced but the second rotational force is reduced in accordance with the detected first rotational force, it is unlikely for the second rotational force to decrease suddenly, and it is unlikely for the user to feel that the assisting force has been cut off during the gearshift action.

In accordance with a second aspect of the present invention, the bicycle control apparatus according to the first aspect is configured so that the controller is programmed to control the second rotational force outputted by the electric riding assistance motor so that a combined rotational force that is a sum of the first rotational force and the second rotational force imparted to the rear sprocket is equal to or less than a prescribed value. In this way, for example, the transmission can be reliably actuated by setting this prescribed value to the maximum value at which the transmission can shift gears.

In accordance with a third aspect of the present invention, the bicycle control apparatus according to the second aspect is configured so that the controller is programmed to set the prescribed value for each shift position of the transmission. In this case, because the prescribed value is set for each shift position, the second rotational force can be reduced by a smatter percentage in accordance with the shift position.

In accordance with a fourth aspect of the present invention, the bicycle control apparatus according to the second or third aspect is configured so that the controller is programmed to set the prescribed value in relation to a maximum value at which an internal transmission can shift gears, where the internal transmission is provided to a rear wheel of the bicycle. An internal transmission commonly stands a cam upright and lays the cam sideways to select a shift position. When excessive rotational force acts on the cam at this time, the gearshift action cannot be performed. Because the gearshift action is performed when the combined value of the first rotational force and the second rotational force decreases to or below the maximum value at which the internal transmission can shift gears, the gearshift action can be performed reliably in the internal transmission.

In accordance with a fifth aspect of the present invention, the bicycle control apparatus according to the fourth aspect is configured so that the controller is programmed to set the prescribed value to a range of 50 to 100 percent of the maximum value. The second rotational force can thereby be reduced by a lower percentage.

In accordance with a sixth aspect of the present invention, the bicycle control apparatus according to the fifth aspect is configured so that the controller is programmed to set the prescribed value to a range of 80 to 100 percent of the maximum value. The second rotational force can thereby be reduced by a lower percentage.

In accordance with a seventh aspect of the present invention, the bicycle control apparatus according to any one of the second to sixth aspects is configured so that the controller is programmed to inhibit gear shifting by the transmission upon determining that the first rotational force detected by the rotational force detector exceeds the prescribed value. When only the first rotational force exceeds the prescribed value, there is a risk that excessive force will act on the transmission and the gearshift action will not be possible, and the load imposed on the gearshift action of the bicycle control apparatus can therefore be suppressed by inhibiting the gear shifting by the transmission.

In accordance with an eighth aspect of the present invention, the bicycle control apparatus according to the seventh aspect is configured so that when the controller has inhibited gear shifting by the transmission, the controller is programmed to stop inhibiting gear shifting by the transmission upon determining that the first rotational force detected by the first rotational detector falls below the prescribed value. In this case, the gearshift action can be reliably performed because the gearshift action is performed when the first rotational force falls below the prescribed value.

In accordance with a ninth aspect of the present invention, the bicycle control apparatus according to any one of the first to eighth aspects is configured so that the controller is programmed to control the electric riding assistance motor and the transmission in accordance with a gearshift command.

In accordance with a tenth aspect of the present invention, the bicycle control apparatus according to the ninth aspect further comprises a gearshift command part operatively communicating with the controller to send the gearshift command to the controller. In this case, the gearshift command can be sent by the user.

According to the present invention, a user is not likely to feel that assisting force has been cut off during the gearshift action.

Also other objects, features, aspects and advantages of the disclosed bicycle control apparatus will become apparent to those skilled in the art from the following detailed description, which, taken in conjunction with the annexed drawings discloses embodiments of the bicycle control apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
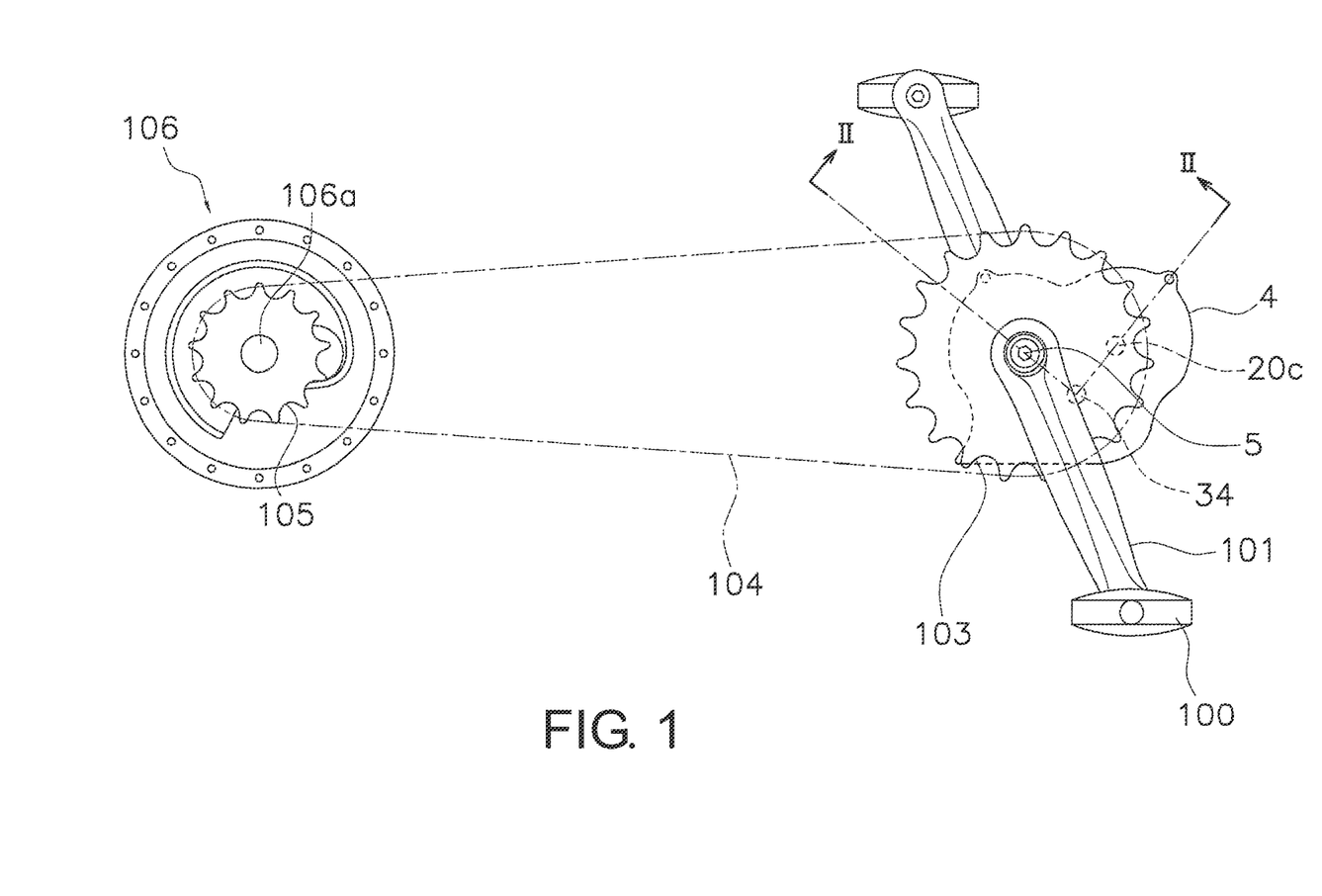
FIG. 1 is a side view showing part of an electrically assisted bicycle incorporating the control apparatus according to the first embodiment of the present invention.

In a motor-assisted bicycle in FIG. 1, a pedaling force T1 acting on a pedal 100 goes through a route including a crank 101→a crank axle 5→a drive unit 4→a front sprocket 103→a chain 104→and a rear sprocket 105, and rotation about a hub axle 106a provided to a rear wheel is transmitted to an internal gearshift hub 106. The internal gearshift hub 106 is an example of a transmission. The pedaling force T1 is an example of first rotational force, and is expressed as torque detected by a torque sensor 50 described hereinafter. The torque sensor 50 is an example of a rotational force detector for detecting a rotational force applied to the crank 101. The internal gearshift hub 106 is an electric geared hub having eight shift positions, for example. The internal gearshift hub 106 has the gearshift unit 112 shown in FIG. 4. The internal gearshift hub 106 is operated to shift gears by a gearshift operation part 70 (see FIGS. 3 and 4) provided to a handlebar 108, shown in FIG. 3, of the electrically assisted bicycle, for example.

This electrically assisted bicycle is controlled by a controller 110a of a bicycle control apparatus 110 according to the first embodiment of the present invention. The bicycle control apparatus 110 controls an electric riding assistance motor 20, whereby assist torque T2 of the riding assistance motor 20 is added to the pedaling force T1 acting on the crank 101 in the drive unit 4, and the ride of the electrically assisted bicycle is assisted by the riding assistance motor 20. The riding assistance motor 20 is an example of an electric motor for riding assistance, and is denoted below simply as the motor 20. The assist torque T2 is an example of the second rotational force. The motor 20 and the torque sensor 50 are provided to the drive unit 4.

In the present embodiment, the electrically assisted bicycle has two assist modes: a high assist mode A1 of assisting with an assist torque T2 that is N1 times the pedaling force T1, and a low assist mode A2 of assisting with an assist torque T2 that is N2 times the pedaling force T1. N1 and N2, which express numerals of an assist ratio AR established in advance, are selected so that N1>N2. N1 is selected as 2, for example, and N2 is selected as 1, for example.

The present embodiment detects the pedaling force T1 of the user through a torque sensor 50, and when the detected value of the pedaling force T1 exceeds a prescribed value Ts, the bicycle control apparatus 110 does not perform the shifting action. The prescribed value Ts is set in relation to a maximum value Tmax at which the internal gearshift hub 106 can shift, and is expressed as torque. For example, the value Ts is selected as a torque 100 to 50 percent of the maximum value Tmax, and preferably 100 to 80 percent of the maximum value Tmax. In the present embodiment, the prescribed value Ts is set in accordance with the shift position of the internal gearshift hub 106. The maximum value Tmax at which the internal gearshift hub 106 can shift differs with each shift position. Table 1 shows the relationship between the shift positions and the maximum value Tmax at which shifting is possible.

TABLE 1

| Shift Position | Maximum Value Tmax |
|---|---|
| 1 | Tmax1 |
| 2 | Tmax2 |
| 3 | Tmax3 |
| 4 | Tmax4 |
| 5 | Tmax5 |
| 6 | Tmax6 |
| 7 | Tmax7 |
| 8 | Tmax8 |

The maximum value at which shifting is possible in the lowest speed, which is the first shift position, for example, is Tmax1, and the value Ts is selected as 95 percent of the maximum value Tmax1, for example. In the highest speed, which is the eighth shift position, for example, the maximum value at which shifting is possible is Tmax8, and the value Ts is selected as 95 percent of the maximum value Tmax8, for example.

When the combined torque T3, which is the sum of the pedaling force T1 and the second torque (T3=T1+T2), exceeds the value Ts, the controller 110a reduces the assist torque T2 so that the combined torque T3 exceeds the value Ts. Torque exceeding the value Ts is thereby prevented from acting on the internal gearshift hub 106. As a result, the shifting action of the internal gearshift hub 106 can be performed smoothly.

The drive unit 4 provided with the motor 20 is commonly disposed in proximity to the linking part between the bottom end of the seat tube of the frame and the rear end of the down tube of the frame, and is fixed to the frame by a bolt (not shown). A battery 150 (see FIG. 4) for driving the motor is disposed along a rear carrier, a down tube, or the seat tube.

Figure 2:
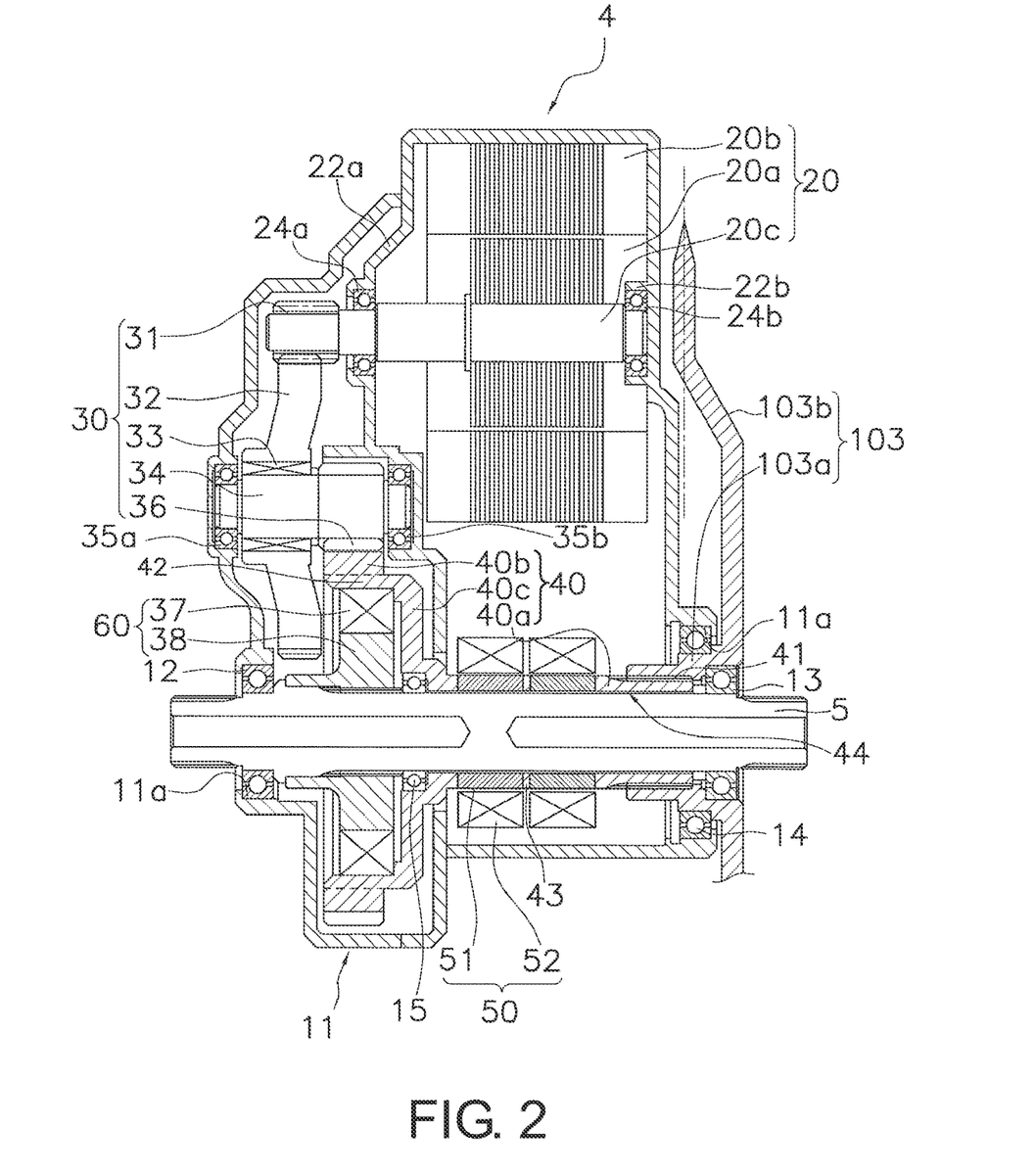
FIG. 2 is a cross-sectional view of the drive unit controlled by the control apparatus, as seen from the dividing cross-section line shown in FIG. 1.

In FIG. 2, the drive unit 4 is configured including the motor 20, a first connecting part 30, a second connecting part 60, a drive force transmission part 40, and a torque sensor 50.

In the drive unit 4, the crank axle 5 is inserted into a through-hole 11a in a casing 11, as shown in FIG. 2. Both axial ends of the crank axle 5 protrude from the casing 11. The end on the side opposite the front sprocket 103 is rotatably supported on the casing 11 via a first bearing 12. The end on the side with the front sprocket 103 is rotatably supported on the casing 11 via a second bearing 13, the front sprocket 103, and a third bearing 14. The second bearing 13 is supported on the front sprocket 103, and the front sprocket 103 is rotatably supported in the third bearing 14. A crank 101 (see FIG. 1) is removably attached to each axial end of the crank axle 5. Of the two cranks 101, one crank 101 may be configured so as to not be detachable from the crank axle 5. The first bearing 12, the second bearing 13, and the third bearing 14 take the form of, for example, radial bearings.

Configuration of Motor

The motor 20 is disposed so that a rotating shaft 20c thereof is parallel with crank axle 5. The rotating shaft 20c of the motor 20 is rotatably supported by a fourth bearing 24a and a fifth bearing 24b disposed at a gap apart from each other along the rotating shaft 20c. The rotating shaft 20c is fixed to a rotor 20a of the motor 20. A stator 20b of the motor 20 is provided to the outer periphery of the rotor 20a and is fixed to the casing 11. The fourth bearing 24a and the fifth bearing 24b are respectively supported by an attachment part 22a and an attachment part 22b provided to the casing 11. The fourth bearing 24a and the fifth bearing 24b are actualized as radial bearings, for example.

The output of the motor 20 is transmitted to the drive force transmission part 40 via a first gear 31→a second gear 32→a first one-way clutch 33→a rotating shaft 34→and a third gear 36. In the present invention, the first connecting part 30 is configured including the first gear 31, the second gear 32, the first one-way clutch 33, the rotating shaft 34, and the third gear 36. The rotational axis of the rotating shaft 34 and the rotational axes of the crank axle 5 and the rotating shaft 20c of the motor 20 are disposed parallel to each other. The rotational axis of the rotating shaft 34 is provided to a position separate from the plane including the rotational axes of the crank axle 5 and the rotating shaft 20c of the motor 20. The crank axle 5 and the rotating shaft 20c of the motor 20 can thereby be disposed as close together as possible, and the drive unit 4 can be made smaller.

The first gear 31 is firmly fixed to a rotating shaft 21. The first gear 31 thereby rotates integrally with the rotating shaft 21.

The second gear 32 meshes with the first gear 31. The second gear 32 is supported to be capable of rotating in one direction about the rotating shaft 34 via the first one-way clutch 33. The first one-way clutch 33 takes the form of for example, a one-way clutch comprising a pawl and a ratchet. The first one-way clutch 33 is provided so as to transmit the rotation of the second gear 32 to the rotating shaft 34, but to not transmit the rotation of the rotating shaft 34 to the second gear 32.

The rotating shaft 34 is rotatably supported by a sixth bearing 35a and a seventh bearing 35b disposed at a gap apart from each other along the rotating shaft 34. The sixth bearing 35a and the seventh bearing 35b are supported on the casing 11. The sixth bearing 35a and the seventh bearing 35b take the form of, for example, radial bearings.

The third gear 36 is firmly fixed with the rotating shaft 34. The third gear 36 thereby rotates integrally with the rotating shaft 34. The third gear 36 may be formed integrally with the rotating shaft 34. The third gear 36 meshes with the drive force transmission part 40, described hereinafter.

The second gear 32 has a greater number of teeth than the first gear 31, and the drive force transmission part 40 has a greater number of teeth than the third gear 36. Furthermore, the second gear 32 has a greater number of teeth than the third gear 36. The first gear 31 and the second gear 32 mesh, and the third gear 36 and the drive force transmission part 40 mesh, thereby down shifting by two speeds. Thus, the first connecting part is a downshifting mechanism.

Configuration of Second Connecting Part

The user's pedaling three is transmitted to the drive force transmission part 40 via the pedal 100→the crank 101→the crank axle 5→and a second one-way clutch 37. In the embodiment of the present invention, the second connecting part 60 is configured including the second one-way clutch 37 and a second one-way clutch attachment part 38. The second one-way clutch attachment part 38 is firmly fixed to the crank axle 5. The second one-way clutch attachment part 38 thereby rotates integrally with the crank axle 5. The second one-way clutch 37 is provided to the outer periphery of the second one-way clutch attachment part 38. The second one-way clutch 37 takes the form of, for example, a one-way clutch comprising a pawl and a ratchet. The second one-way clutch 37 is provided on as to transmit the rotation of the crank axle 5 to a linking part 42, but to not transmit the rotation of the linking part 42 to the crank axle 5.

Configuration of Drive Force Transmission Part

The drive force transmission part 40 transmits rotational force combining the output of the motor 20 and the rotational force of the crank axle 5 (combined rotational force) to the front sprocket 103. The drive force transmission part 40 comprises a sprocket connecting part 41, a linking part 42, and a sensor placement part 43. Preferably, the drive force transmission part 40 further comprises a through-hole 44 through which the crank axle 5 is inserted. The drive force transmission part 40 here is formed into a tubular shape. The drive force transmission part 40 includes a first tubular part 40a having the sprocket connecting part 41 and the sensor placement part 43, a second tubular part 40b forming the linking part 42, and a connecting part 40c connecting the first tubular part 40a and the second tubular part 40b. The first tubular part 40a, the second tubular part 40b, and the connecting part 40c are formed integrally.

The sprocket connecting part 41 is capable of linking the front sprocket 103. The sprocket connecting part 41 firmly fixes the front sprocket 103 to the drive force transmission part 40 using serrations or splines, for example. The front sprocket 103 may be press-fitted into the sprocket connecting part 41. The end of the drive force transmission part 40 on the sprocket connecting part 41 side is rotatably supported on the casing 11 via the front sprocket 103 and the third bearing 14. The front sprocket 103 comprises a base part 103a connected to the sprocket connecting part 41, and a sprocket main body 103*b*. The front sprocket 103 is formed into a tubular shape, and the sprocket connecting part 41 is connected to the inner periphery thereof. The second bearing 13 is supported on the inner periphery of the base part 103*a*, and the outer periphery is supported in the third bearing 14. The base part 103*a* protrudes inward from the outer side of the casing 11, through the through-hole 11*a*.

In the sprocket main body 103*b*, starting at the end of the base part 103*a* protruding outward from the casing 11, teeth extending along the diameter are formed in the outer periphery. In the present embodiment, the base part 103*a* and the sprocket main body 103*b* are formed integrally, but they may also be configured separately. In the present embodiment, the outer periphery of the sprocket main body 103*b* is offset toward the casing 11 from the base end coupled to the base part 103*a*.

The linking part 42 links the first connecting part 30 and the second connecting part 60. In other words, the linking part 42 has a gear that meshes with the third gear 36, and the linking part 42 connects to the second one-way clutch 37. The linking part 42 is preferably provided separate from the sprocket connecting part 41 in the direction of the crank axle 5, so that the torque sensor 50, described hereinafter, easily detects torsion in the drive force transmission part 40.

The second tubular part 40*b* forming the linking part 42 is formed into a tubular shape larger in outside diameter than the first tubular part 40*a*. The connecting part 40*c* extends outward along the diameter from the end of the first tubular part 40*a* on the side opposite the sprocket connecting part 41, and the outer periphery of the diameter is connected to the second tubular part 40*b*. The second tubular part 40*b* extends from the connecting part 40*c* toward the side opposite the sprocket connecting part 41.

The third gear 36 is connected to the outer periphery of the linking part 42, and the second one-way clutch 37 is connected to the inner periphery. The third gear 36 and the second one-way clutch 37 are provided so as to at least partially overlap in a direction perpendicular to the crank axle 5.

The end of the first tubular part 40*a* on the side opposite the sprocket connecting part 41 is rotatably supported on the crank axle 5 via the an eighth bearing 15. The eighth bearing 15 is disposed between the connecting part 40*c* and the crank axle 5. The eighth bearing 15 is actualized as a radial bearing, for example.

At least part of the torque sensor 50 is provided to the sensor placement part 43. The torque sensor 50 is configured including a magnetostrictive element 51 and a detection coil 52. The sensor placement part 43 is disposed between the sprocket connecting part 41 and the linking part 42. More preferably, the sensor placement part 43 is provided to the outer periphery of the first tubular part 40*a*. The magnetostrictive element 51, which is part of a magnetostrictive sensor, for example, is provided to the sensor placement part 43. When the magnetostrictive element 51 is provided to the sensor placement part 43, the coil 52 for detecting torsion in the magnetostrictive element 51 is provided to the outer periphery of the first tubular part 40*a*. In this case, the torque sensor 50 for detecting twisting of the first tubular part 40*a* is formed by the magnetostrictive element 51 and the coil 52. The detection coil 52 is provided to a coil-holding member (not shown) for holding the detection coil 52. The coil-holding member is fixed to the casing. The twisting of the first tubular part 40*a* corresponds to the torque occurring in the first tubular part 40*a*.

The example of the torque sensor 50 shown in FIG. 2, having the magnetostrictive element 51 and the coil 52, is only one example, and a strain gauge or a semiconductor strain sensor may be provided to the sensor placement part 43 instead of the magnetostrictive element. When a strain gauge, a semiconductor strain sensor, or the like is provided to the sensor placement part 43, a transmitter for wirelessly transmitting signals from the strain gauge, the semiconductor strain sensor, or the like is also provided to the sensor placement part 43, for example, and the signals or information based on the signals are outputted wirelessly to the exterior. An optical sensor for using light to detect strain in the sensor placement part 43 may also be provided instead of the torque sensor 50.

Configuration of Gearshift Operation Part

Figure 3:
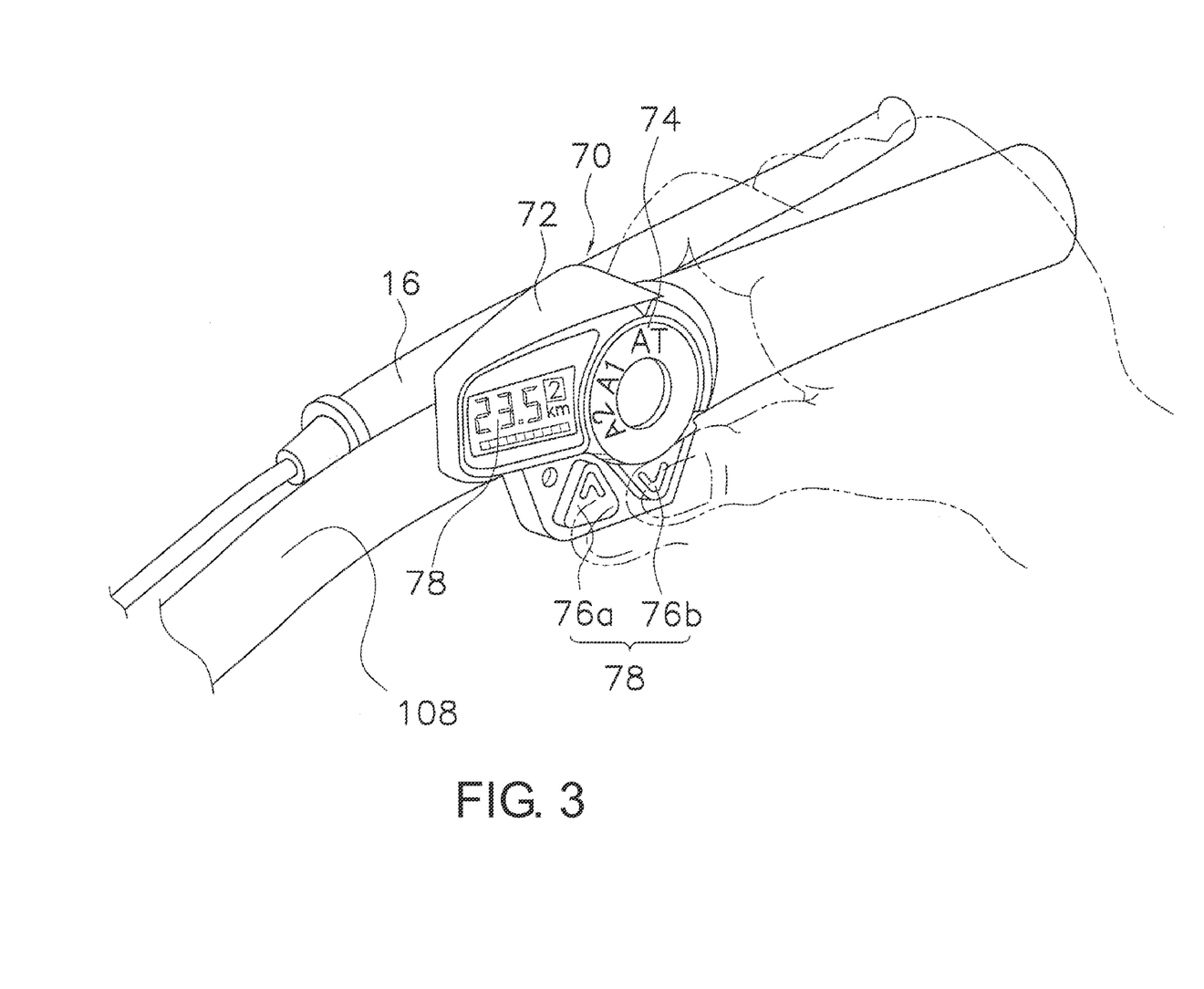
FIG. 3 is a perspective view showing the operating part for selecting the gear shift operation and the assist mode.

The gearshift operation part 70 has, as shown in FIG. 3, an operation panel 72, a mode dial 74 turnably provided to the operation panel 72, a gearshift switch 76 including two push buttons 76*a* and 76*b*, and a display unit 78. The operation panel 72 is formed integrally on a right-side brake lever 16 in a state in which the gearshift operation part 70 is mounted to the handlebar 108. The mode dial 74 is provided in order make a selection between the high assist mode A1 and the low assist mode A2 during manual shifting mode, and also to make a selection of an automatic shifting mode AT. In the assist mode during the automatic shifting mode, the motor is controlled with the same assist ratio as in the high assist mode A1, for example. The two push buttons 76*a* and 76*b* are used during manual shifting mode. The gearshift operation part 70 is disposed with the two push buttons 76*a* and 76*b* aligned left and right of each other below the mode dial 74. The push button 76*a* is for shifting up, for example, and the push button 76*b* is for shifting down, for example. The display unit 78 is disposed in alignment with the mode dial 74. The current shift position, the current bicycle speed, the remaining battery life, and other information are displayed on the display unit 78.

Electric Configuration of Electrically Assisted Bicycle

Figure 4:
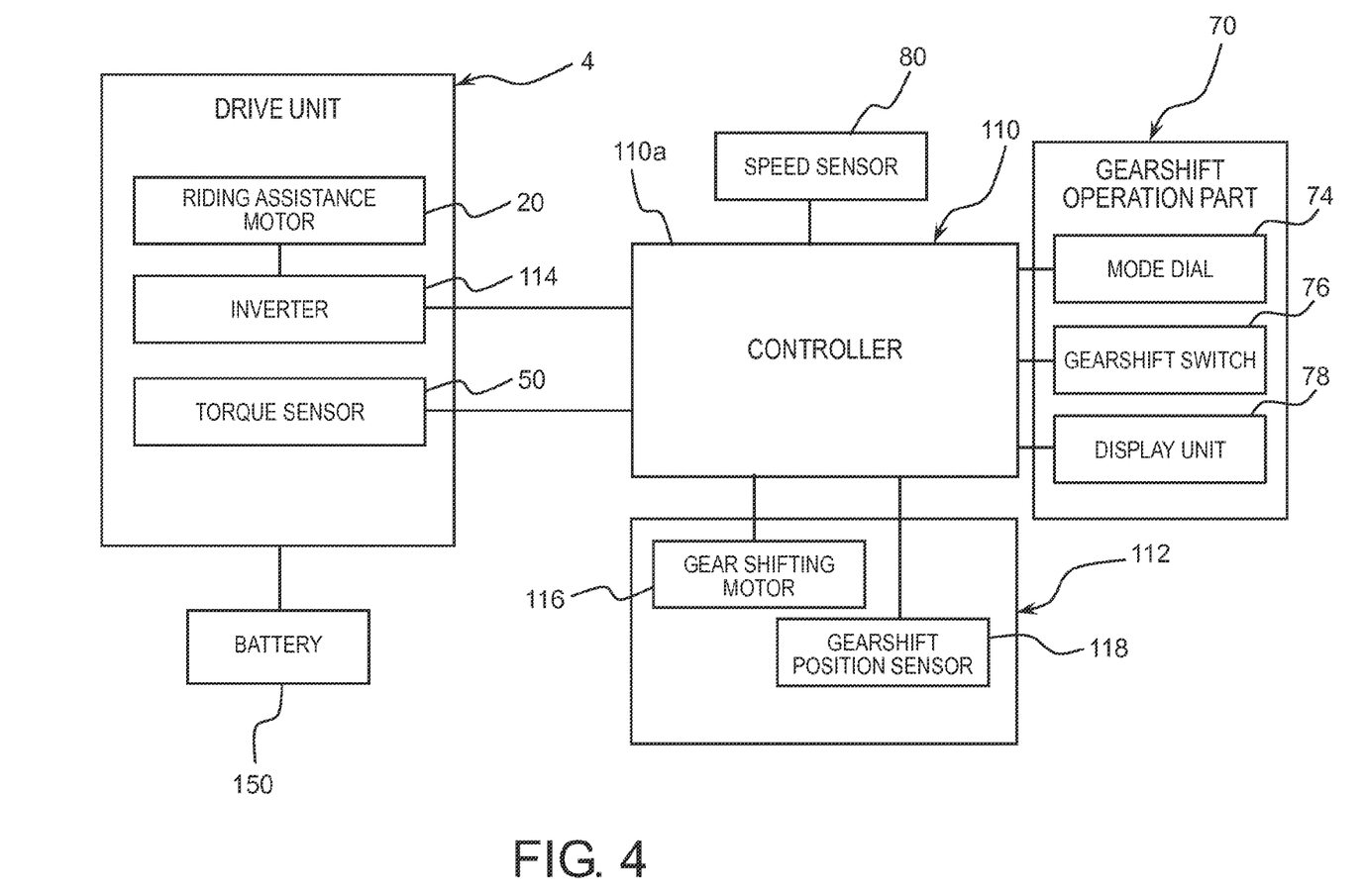
FIG. 4 is a block diagram of a control system including the control apparatus according to the present invention.

FIG. 4 is a block diagram showing the electric configuration of an electrically assisted bicycle including the drive unit 4. The electrically assisted bicycle is configured including the drive unit 4, the bicycle control apparatus 110 including the controller 110*a* and the torque sensor 50, the gearshift operation part 70, and the gearshift unit 112. The controller 110*a* may be provided independent of the drive unit 4. For example, the controller 110*a* may be disposed along the rear carrier, the down tube, or the seat tube. The controller 110*a* may be disposed inside the casing 11 of the drive unit 4. The drive unit 4 includes the previously described motor 20 and torque sensor 50, and also an inverter 114. The gearshift unit 112 includes a gear shifting motor 116 and a gearshift position sensor 118. The inverter 114 and the torque sensor 50 of the drive unit 4 are electrically connected to the controller 110*a*. The mode dial 74, the gearshift switch 76, and the display unit 78 of the gearshift operation part 70 are also electrically connected to the controller 110*a*. Furthermore, the gear shifting motor 116 and the gearshift position sensor 118 of the gearshift unit 112 are electrically connected to the controller 110*a*. Furthermore, a speed sensor 80 is electrically connected to the controller 110*a*. The speed sensor 80 detects the riding speed of the bicycle. The speed sensor 80 is configured including a magnet attached to the wheel of the bicycle, and a magnet-detecting sensor attached to the frame, for example. The battery 150 is electrically connected to the controller 110*a* and other electric components, and the battery 150 supplies electric power.

FIG. 4 schematically shows the connecting relationship among the electric devices. In this embodiment, the electric devices are connected by a power line communication line compliant with power line communication (PLC) standards.

Therefore, the electric devices including the controller 110a are preferably connected in series by a duplex power line. In power line communication, communication among the electric devices is performed at predetermined time intervals in order to synchronize the devices. The electric devices are connected by power line communication, but the electric wires may each be connected by a communication line and a power line and may transmit communication and power using different wires.

The motor 20 takes the form of, for example, a three-phase brushless DC motor, and is driven by the inverter 114. Through switching control, the inverter 114 converts the direct current to a three-phase alternating current on the basis of a command from the controller 110a.

The controller 110a controls the inverter 114 and the gearshift unit 112 in accordance with the pedaling force and the speed of the bicycle. The torque sensor 50 detects rotational force (combined torque T3) which is the sum of the output of the motor 20 (the assist torque T2) and the rotational force of the crank axle 5 (the pedaling force T1). The controller 110a is configured including a central processing unit (CPU), and a memory on which predetermined programs are recorded, for example. The controller 110a has correlation information on commands outputted to the inverter 114 in order to drive the 20, and the torque outputted by the motor 20 in accordance with these commands. The correlation information may be displayed in the form of a table, or displayed by a relational expression. The controller 110a is therefore capable of perceiving the output torque of the motor 20 (the assist torque T2). Therefore, the controller 110a can subtract the perceived assist torque T2 of the motor 20 from the combined torque T3 detected by the torque sensor 50 to find the pedaling force T1 (T1=T3−T2). The controller 110a can thereby control the motor 20 in accordance with the pedaling force T1. The controller 110a may also measure the electric current flowing to the motor 20 to estimate the output of the motor 20, i.e. the assist torque T2.

The gearshift unit 112 and the gear shifting motor 116 cause a cam (not shown) of the internal gearshift hub 106 to turn according to a gearshift command from the controller 110a, causing the internal gearshift hub 106 to undergo the gearshift action.

During manual shifting mode, the gearshift operation part 70 outputs a gearshift command through the push button 76a or the push button 76b of the gearshift switch 76. The gearshift switch 76 is an example of the gearshift command part. During automatic shifting mode AT, the controller 110a selects the appropriate shift position to perform gearshift control, according to the detection result of the speed sensor 80. Therefore, gearshift commands during automatic shifting are carried out by software.

Gearshift Control of Controller

Figure 5:
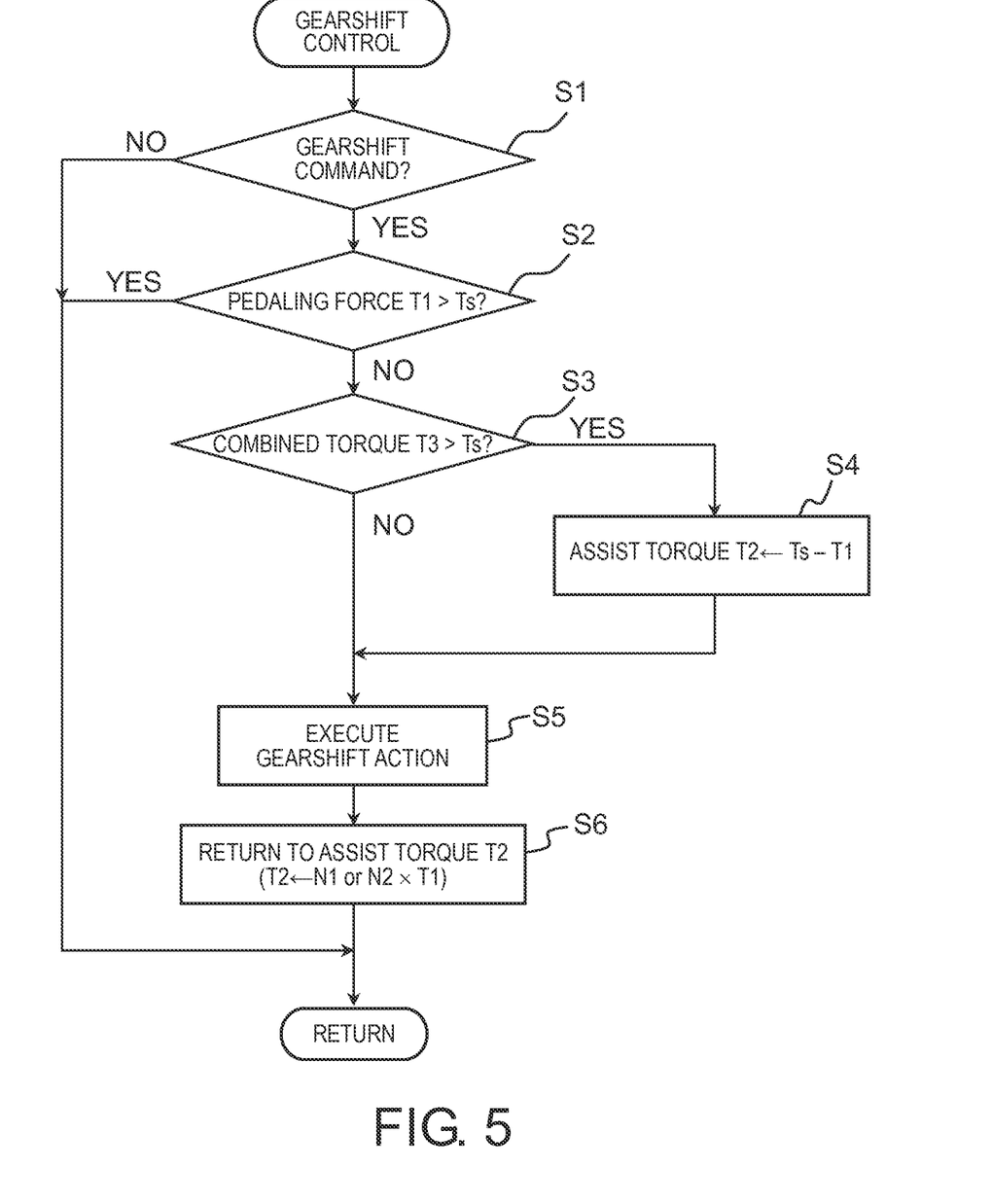
FIG. 5 is a flowchart showing an example of the action during gearshift control of the control apparatus.

An example of the gearshift control of the controller 110a is described in detail based on the flowchart shown in FIG. 5. The control action shown in FIG. 5 is only one example, and the present invention is not limited to the control action shown in FIG. 5.

In step S1 of FIG. 5, the controller 110a determines whether or not there is a gearshift command. As previously described, a gearshift command is sent to the controller 110a when a gearshift is instructed by a pushing of the push button 76a or the push button 76b of the gearshift switch 76 during manual shifting mode. During automatic shifting mode AT, a gearshift command is generated according to the bicycle speed detected by speed sensor 80. When there is no gearshift command, the following steps are skipped and the process is not performed. Upon determining that there is a gearshift command, the process transitions to step S2. In step S2, the assist torque T2 perceived by the controller 110a is subtracted from the combined torque T3 detected by the torque sensor 50 to detect the pedaling force T1, and a determination is made as to whether or not the detected pedaling force T1 exceeds the prescribed value Ts. When the pedaling force T1 exceeds the value Ts, steps S3 and beyond are skipped and the process is ended even if there is a gearshift command, in order to inhibit the gear shifting of the internal gearshift hub 106.

When the pedaling force T1 is equal to or less than the value Ts, the process transitions from step S2 to step S3. In step S3, a determination is made as to whether or not the combined torque T3 outputted by the torque sensor 50 exceeds the value Ts. When the combined torque T3 exceeds the value Ts, the process transitions from step S3 to step S4. In step S4, an assist torque T2, which is N1 or N2 times the pedaling force T1 established according to the selected assist mode, is reduced to a value of the pedaling force T1 subtracted from the value Ts (Ts−T1), and the process transitions to step S5. When the combined torque T3 is equal to or less than the value Ts, the process transitions from step S3 to step S5. In step S5, a gearshift action according to the gearshift command is executed. When this gearshift action is executed, the gearshift action can be performed smoothly because the combined torque T3 is already equal to or less than the value Ts.

When the gearshift action is complete, the process transitions from step S5 to step S6. In step S6, to return the assisting power to the original amount, the assist torque T2 is multiplied to N1 or N2 times the pedaling force T1 in accordance with the selected assist mode, and the gearshift process is ended.

In this gearshift process, in step S4, the assist torque T2 is not entirely reduced, but a process of reducing the assist torque T2 is performed according to the pedaling force T1, the assist torque T2 is therefore not likely to decrease suddenly, and the user is not likely to feel that the assisting force has been cut off even if the assist torque T2 is reduced during the gearshift action.

Second Embodiment

Figure 6:
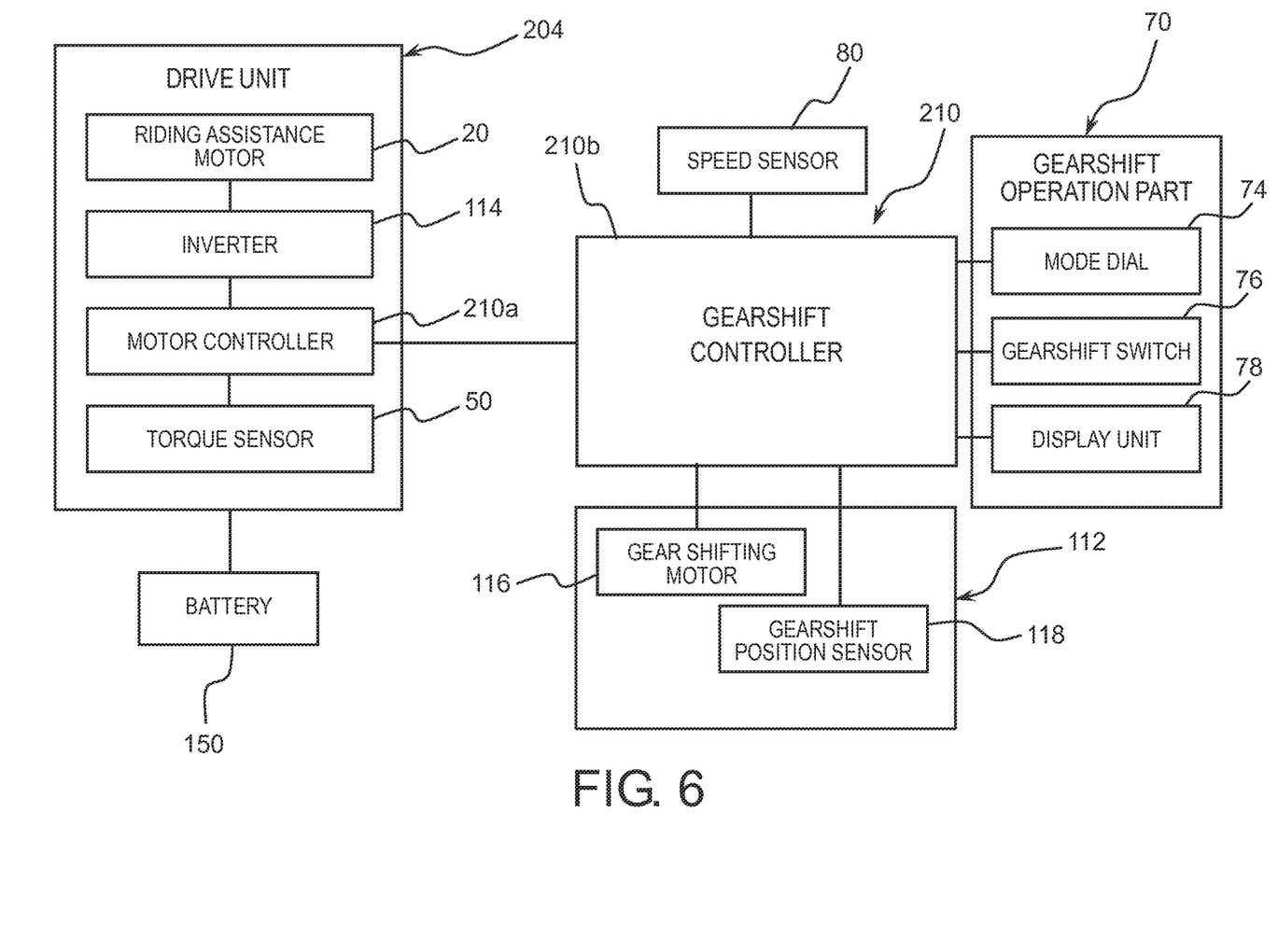
FIG. 6 is a block diagram showing the configuration of a control system including the control device according to the second embodiment of the present invention.

In the second embodiment, a bicycle control apparatus 210 is configured including a motor controller 210a for controlling the motor 20, a gearshift controller 210b for controlling the internal gearshift hub 106, and a torque sensor 50, as shown in FIG. 6. Therefore, the motor 20 and the internal gearshift hub 106 are controlled individually by two controllers (the motor controller 210a and the gearshift controller 210b), and communication between the two controllers is performed to perform the process of reducing the assist torque T2 during the gearshift action. The motor controller 210a and the gearshift controller 210b have the same configuration as the controller 110a; for example, the two controllers are each configured including a central processing unit (CPU) and a memory on which predetermined programs are recorded. The gearshift controller 110a preferably actuates during the gearshift action, and therefore actuates in a power conservation mode aside from the time period from the receipt of a gearshift command until the completion of the gearshift action.

The inverter 114 of a drive unit 204 is controlled by the motor controller 210a. The motor controller 210a may be provided inside the drive unit 204, but may also be provided separate from the drive unit 204. The gearshift controller 210b may be disposed similar to the controller 110a, but may also be provided to the gearshift unit 112. The configuration is otherwise the same as shown in FIG. 6, and is therefore not described further. In the second embodiment, components having the same configuration as those in FIG. 4 are denoted by the same symbols as FIG. 4.

Figure 7:
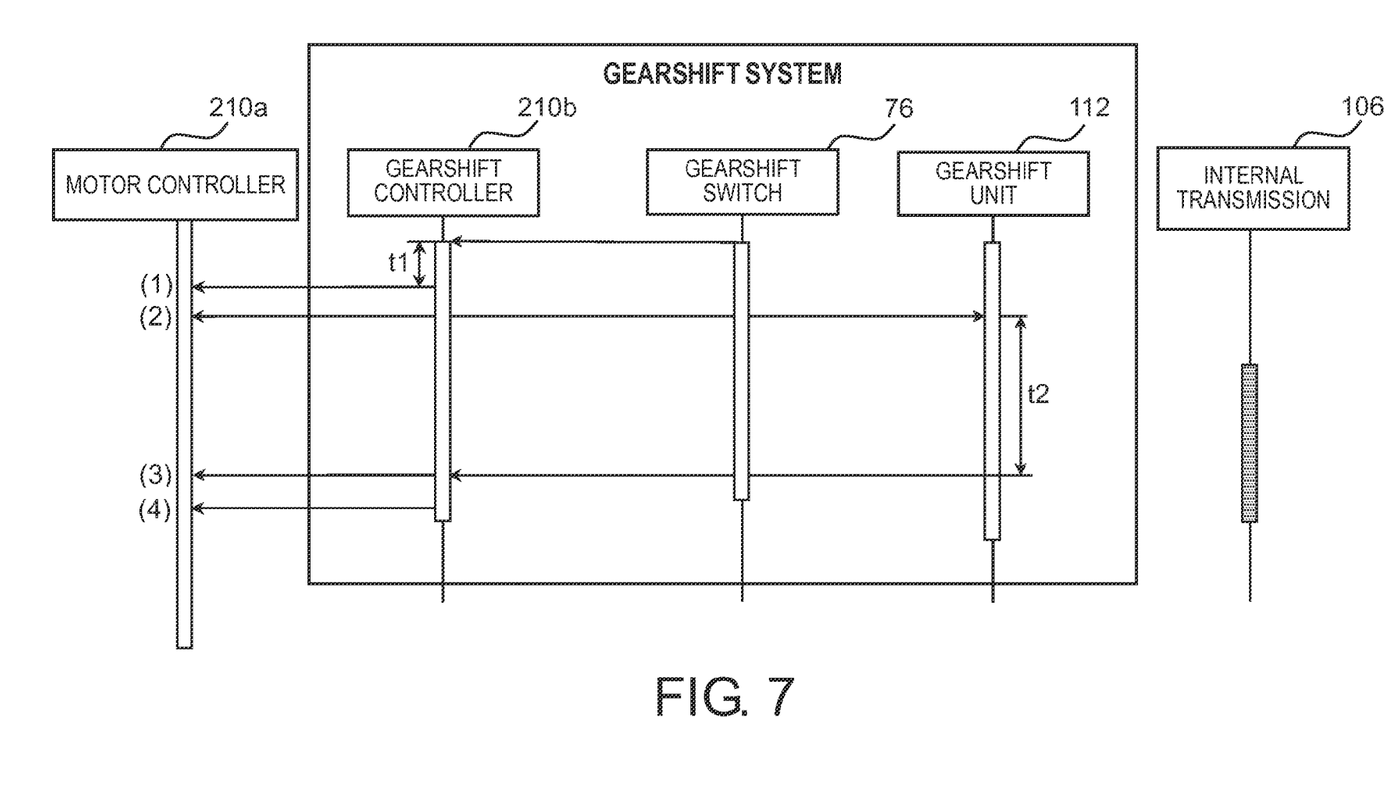
FIG. 7 is a chart showing an example of the control sequence of the control apparatus according to the second embodiment.

In the second embodiment, when a gearshift command is outputted from the gearshift switch 76 during manual gear shifting, for example, the command is received by the gearshift controller 210b, as shown by the control sequence of FIG. 7. When the gearshift controller 210 receives the gearshift command, at (1) of FIG. 7, the motor controller 210a is notified that power conservation mode has changed over to normal control mode after t1 (e.g., 40 m) seconds, for example. Then, at (2) of FIG. 7, the gearshift controller 210b outputs a gearshift start notification to the motor controller 210a and the gearshift unit 112. When the motor controller 210a receives the gearshift start notification, a determination is made as to whether or not the combined torque T3 detected by the torque sensor 50 exceeds the value Ts, and when the combined torque exceeds the value Ts, the assist torque T2 is reduced by the same action as in step S4 of FIG. 5 (T2←Ta−T1).

When a gearshift start notification is received in the gearshift unit 112, the gear shifting motor 116 is actuated for t2 (e.g., 200 m) seconds. This actuation time is the time needed to shift one gear. When the gear shifting motor 116 rotates, a cam member (not shown) of the internal gearshift hub 106 rotates and the internal gearshift hub 106 performs the shifting action with a slight delay. At this time, in the motor controller 210a as previously described, the assist torque T2 is reduced when the combined torque T3 exceeds the value Ts.

When the action of the gear shifting motor 116 is complete, a completion signal is sent from the gearshift position sensor 118 to a gearshift controller 219b. When the gearshift controller 219b receives the completion signal, the gearshift controller 219b delivers the gearshift completion notification shown at (3) in FIG. 7 and the power conservation mode transition notification shown at (4) to the motor controller 210a.

Figure 8:
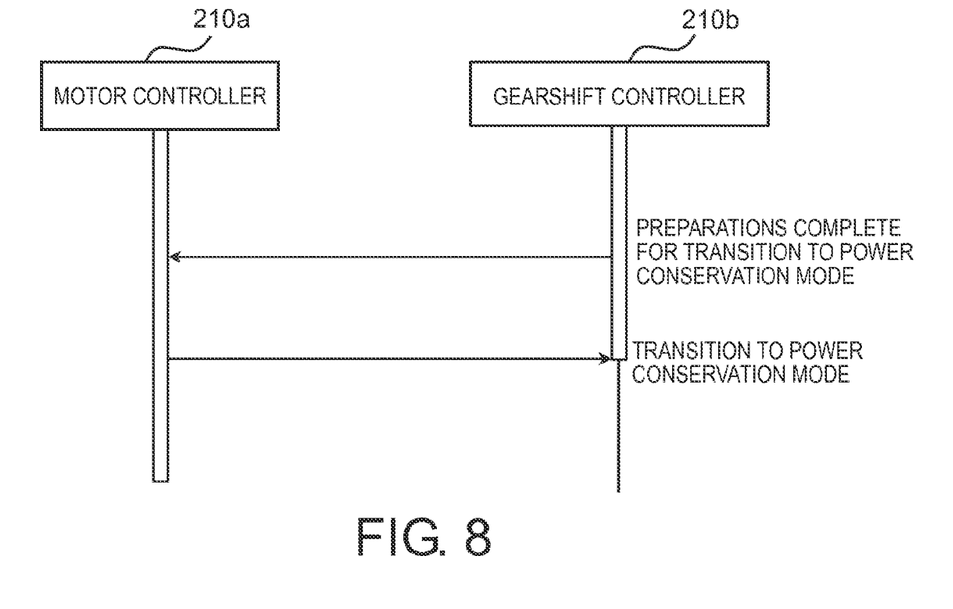
FIG. 8 is a chart showing an example of the control sequence during a transition to power conservation mode.

In the present embodiment, as shown in FIG. 8, when the power conservation mode transition notification is issued, the notification is issued after preparations to transition to power conservation mode are complete. In the motor controller 210a, when the power conservation mode transition notification is received, the gearshift controller 210b is notified of a signal indicating that the power conservation mode transition notification from the gearshift controller 210b has been received. The gearshift controller 210b thereby transitions to power conservation mode.

Figure 9:
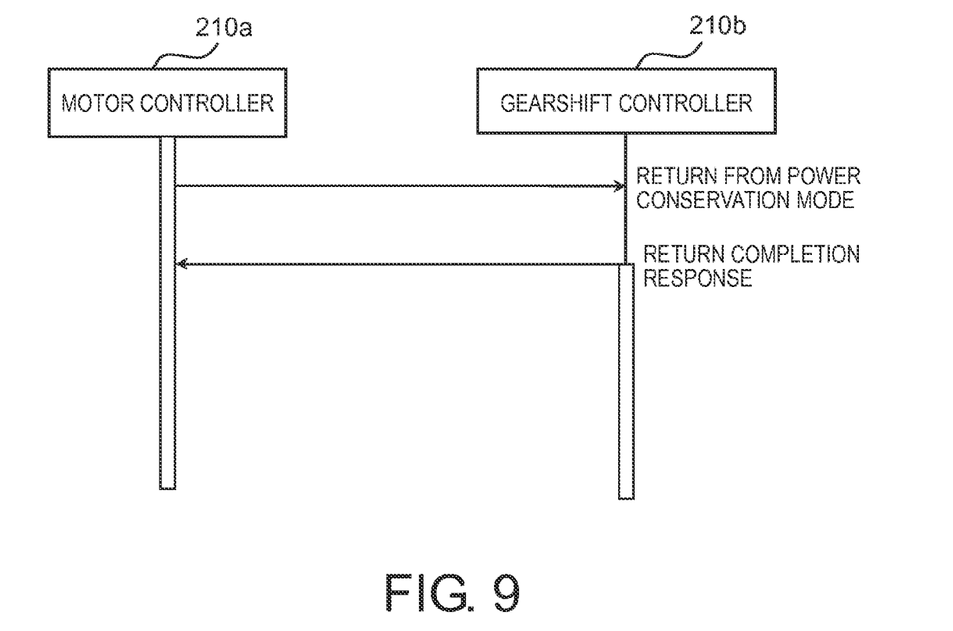
FIG. 9 is a chart showing an example of the control sequence during a return from power conservation mode.

When power conservation mode changes over to normal control mode, there are cases in which the change is made by input of a specified speed or the like from the gearshift switch 76 or the speed sensor 80, and there are cases in which the change is made by a request from the motor controller 210a. When a request to change over from power conservation mode is received from the motor controller 210a as shown in FIG. 9, the gearshift controller 210b notifies the motor controller 210a of the changeover completion after the changeover is complete. This is the same as (1) of FIG. 7.

The same operational effects as those of the first embodiment can be obtained with this configuration of the second embodiment as well.

Other Embodiments

Embodiments of the present invention were described above, but the present invention is not limited to the above embodiments; various changes can be made as long as no departure is made from the scope of the invention. Particularly, the plurality of embodiments and modifications written in the present specification can be arbitrarily combined as necessary.

(a) In the first and second embodiments, the internal gearshift hub 106 is controlled by electric power, but the present invention is not limited as such. The present invention can also be applied to an electrically assisted bicycle having an internal gearshift hub that is operated to shift gears by a normal wire. In this case, the wire or the gearshift operation part for controlling the wire is provided with a sensor for detecting this action. When the movement of the gearshift operation part or the wire is detected by the sensor, the motor is controlled so as to reduce the assist torque T2 on the basis of the pedaling force T1 by the controller.

(b) In the first and second embodiments, the second rotational force is reduced before the gearshift action is initiated, but the present invention is not limited as such. In the present invention, if at least part of the gearshift action is performed while the assist torque T2 has been reduced, the assist torque T2 may be reduced at any timing. For example, the second rotational force may be reduced after the gearshift action has initiated. The assist torque T2 may also be reduced at the same time gear shifting is initiated.

(c) in the first and second embodiments, the present invention was describing using an internal gearshift hub as an example of the transmission, but the present invention is not limited as such. The present invention can also be applied to cases of performing gearshift control on an external transmission including a derailleur as the transmission, for example.

(d) In the previous embodiments, the present invention was described exemplifying a "midship" electrically assisted bicycle in which the crank axle of the frame is rotated by a motor, but the present invention is not limited as such. The present invention can also be applied to a control apparatus of an electrically assisted bicycle in which a chain is rotated by a motor to assist riding, the motor is disposed on a rear wheel axle, and a gearshift device is disposed on the output side of the motor, for example.

(e) In the previous embodiments, the value Ts is set in accordance with the shift position of the internal gearshift hub 106, but the value Ts may be set to an equal value for all the shift positions of the internal gearshift hub 106. In this case, the value Ts is selected at or below the minimum value among the maximum values Tmax1, Tmax2, . . . , Tmax7, and Tmax8 of the shift positions of the internal gearshift hub 106; (preferably at a torque from 100 to 50 percent of the minimum of these values, and more preferably from 100 to 80 percent of the minimum of these values.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle control apparatus for controlling a bicycle having a crank, an electric motor for riding assistance, and a transmission in which a first rotational force of the crank and a second rotational force of an electric riding assistance motor for riding assistance are transmitted to a rear sprocket, the bicycle control apparatus comprising:

a rotational force detector configured to detect the first rotational force imparted to the crank; and a controller programmed to reduce the second rotational force of the electric riding assistance motor to actuate the transmission of the bicycle in accordance with the first rotational force detected by the rotational force detector, control the second rotational force outputted by the electric riding assistance motor so that a combined rotational force imparted to the rear sprocket is equal to or less than a prescribed value, the combined rotational force being a sum of the first rotational force and the second rotational force, set the prescribed value in relation to a maximum value at which transmission can shift gears, where the transmission is provided to the rear sprocket of the bicycle.

2. The bicycle control apparatus according to 1, wherein the controller is programmed to set the prescribed value for each shift position of the transmission.

3. The bicycle control apparatus according to claim 1, wherein the controller is programmed to set the prescribed value to a range of 50 to 100 percent of the maximum value.

4. The bicycle control apparatus according to claim 3, wherein the controller is programmed to set the prescribed value to a range of 80 to 100 percent of the maximum value.

5. The bicycle control apparatus according to claim 1, wherein the controller is programmed to inhibit gear shifting by the transmission upon determining that the first rotational force detected by the rotational force detector exceeds the prescribed value.

6. The bicycle control apparatus according to claim 5, wherein when the controller has inhibited gear shifting by the transmission, the controller is programmed to stop inhibiting gear shifting by the transmission upon determining that the first rotational force detected by the first rotational detector falls below the prescribed value.

7. The bicycle control apparatus according to claim 1, wherein the controller is programmed to control the electric riding assistance motor and the transmission in accordance with a gearshift command.

8. The bicycle control apparatus according to claim 7, further comprising a gearshift command part operatively communicating with the controller to send the gearshift command to the controller.

* * * * *